United States Patent
Yao

(10) Patent No.: US 8,722,793 B2
(45) Date of Patent: May 13, 2014

(54) POLYLACTIC ACID RESIN COMPOSITION, POLYLACTIC ACID RESIN MOLDED ARTICLE AND METHOD FOR PRODUCING POLYLACTIC ACID RESIN COMPOSITION

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 422 days.

(21) Appl. No.: 12/841,563

(22) Filed: Jul. 22, 2010

(65) Prior Publication Data

US 2011/0196089 A1    Aug. 11, 2011

(30) Foreign Application Priority Data

Feb. 8, 2010    (JP) ................. 2010-024962

(51) Int. Cl.
*C08L 75/00*    (2006.01)
*C08L 67/00*    (2006.01)

(52) U.S. Cl.
USPC ............. 524/590; 524/589; 524/599

(58) Field of Classification Search
USPC .......................................... 524/589, 590, 599
See application file for complete search history.

(56) References Cited

U.S. PATENT DOCUMENTS

| | | | |
|---|---|---|---|
| 2005/0143502 | A1 | 6/2005 | Yamada et al. |
| 2006/0025560 | A1* | 2/2006 | Inoue et al. ................. 528/272 |
| 2006/0047026 | A1* | 3/2006 | Yamada et al. ................. 524/9 |

FOREIGN PATENT DOCUMENTS

| | | |
|---|---|---|
| JP | A-2003-192925 | 7/2003 |
| JP | B2-3794853 | 7/2006 |
| JP | A-2008-19294 | 1/2008 |

* cited by examiner

*Primary Examiner* — Aiqun Li
(74) *Attorney, Agent, or Firm* — Oliff PLC

(57) ABSTRACT

A polylactic acid resin composition contains (A) a crosslinked polylactic acid resin and (B) a flame retardant additive.

16 Claims, No Drawings

POLYLACTIC ACID RESIN COMPOSITION, POLYLACTIC ACID RESIN MOLDED ARTICLE AND METHOD FOR PRODUCING POLYLACTIC ACID RESIN COMPOSITION

CROSS-REFERENCE TO RELATED APPLICATIONS

This application is based on and claims priority under 35 USC 119 from Japanese Patent Application No. 2010-024962 filed Feb. 8, 2010.

BACKGROUND

1. Technical Field

The present invention relates to a polylactic acid resin composition, polylactic acid resin molded article and a method for producing a polylactic acid resin composition.

2. Related Art

In recent years, in view of environmental protection, a resin molded article using a biodegradable resin receives attention and is being investigated for various applications. In the field of electric products among the applications, a resin molded article is demanded to have flame retardancy.

SUMMARY

According to an aspect of the invention, there is provided a polylactic acid resin composition containing (A) a crosslinked polylactic acid resin and (B) a flame retardant additive.

DETAILED DESCRIPTION

Exemplary embodiments of the invention will be described in detail below. The invention is not limited to the exemplary embodiments and may be practiced with various modifications unless the substance of the invention is impaired.

Polylactic Acid Resin Composition (A) Crosslinked Polylactic Acid Resin

Examples of the crosslinked polylactic acid resin used as the component (A) in the exemplary embodiment of the invention include one obtained by reacting a polylactic acid resin and a polyfunctional isocyanate compound. A polylactic acid resin and a polyfunctional isocyanate compound forms the crosslinked material through a urethane bond formed mainly by reaction between an end hydroxyl group of the polylactic acid resin and an isocyanate group of the polyfunctional isocyanate compound.

In the exemplary embodiment, such a resin composition is prepared that contains the crosslinked polylactic acid resin (A), which contains a crosslinked structure formed by reaction of a polyfunctional isocyanate compound, a polycarboxylic acid, a polyhydroxycarboxylic acid, a polyamine, a phenol resin, such as resol and novolak, a polyfunctional epoxy resin or the like, and the flame retardant additive used as the component (B) described later. A resin molded article obtained from the resin composition is enhanced in flame retardancy without impairing the flexibility of the polylactic acid resin.

The factors that contribute to the enhancement of flame retardancy without impairing the flexibility of the polylactic acid resin are not clear, but may be considered as follows. A crosslinked polylactic acid resin has spaces formed therein with a relatively loose network. A flame retardant additive in a particle form is fixed in the spaces. According to the mechanism, the flame retardant additive is added without impairing the flexibility of the polylactic acid resin.

There has been such a tendency that the addition of a flame retardant to a polylactic acid resin decreases the flexibility of the resin, which can thus be used only as a purpose that does not require mechanical strength. It has been considered that this is because of the large hardness of the flame retardant itself. In this exemplary embodiment, the flexibility of the polylactic acid, resin is prevented from being decreased even though a large amount of a flame retardant additive is added, and accordingly, the amount of the flame retardant additive added may be increased as compared with the related art.

The crosslinking density of the crosslinked polylactic acid resin (A) may be appropriately selected depending on purposes and is not particularly limited. In the exemplary embodiment, the crosslinking density of the crosslinked polylactic acid resin (A) is generally approximately 1.5 or more, and preferably approximately 1.8 or more. The crosslinking density is generally approximately 6 or less, and preferably approximately 4.5 or less. In the case where the crosslinking density of the crosslinked polylactic acid resin (A) is too small, the mesh size of the network may be increased to provide such a tendency that the flame retardant additive may not be fixed to the spaces of the network. In the case where the crosslinking density is too large, the mesh size of the network may be decreased to provide such a tendency that the flame retardant additive may be excluded from the spaces of the network.

The crosslinking density of the crosslinked polylactic acid resin (A) referred herein means the number of crosslinking points relative to one molecule of the polylactic acid resin, and in the exemplary embodiment, can be obtained by the infrared absorption spectrum (IR) measurement and the proton nuclear magnetic resonance spectrum ($^1$H-NMR) measurement. Specifically, a standard spectrum is prepared with an uncrosslinked polylactic acid resin, and the proportion of the end hydroxyl groups that disappear through the reaction and the proportion of the crosslinking agent introduced through the reaction are determined by the IR and NMR spectra.

Polylactic Acid Resin

Examples of the polylactic acid resin used in the exemplary embodiment include polylactic acid, a copolymer of polylactic acid and other aliphatic polyester, and a blend or alloy of polylactic acid and other aliphatic polyester. In the case of the copolymer, blend or alloy, the amount of the lactic acid component contained is generally approximately 50% by weight or more, preferably approximately 60% by weight or more, and more preferably approximately 70% by weight or more.

Among these, polylactic acid and a copolymer of polylactic acid and other aliphatic polyester are preferred, and polylactic acid is more preferred. The polylactic acid is not particularly limited as far as it is a polymer having repeated lactic acid units, and known polylactic acid may be used. The lactic acid component of the polylactic acid may be L-lactic acid or D-lactic acid, or may contain both of them. In consideration of flexibility, the content of L-lactic acid in the lactic acid component of the polylactic acid is preferably approximately 80% by weight or more, or the content of the D-lactic acid therein is preferably approximately 80% by weight or more. The polylactic acid may contain a copolymer component other than lactic acid in such a range that does not impair the advantages of the invention. Examples of the copolymer component include a hydroxybutyric acid compound, a hydroxyvaleric acid compound and a citric acid compound.

The method for producing the copolymer of polylactic acid and other aliphatic polyester is not particularly limited and may be a known production method. Examples of the method include (1) a method, in which lactic acid or a mixture of lactic acid and an aliphatic hydroxycarboxylic acid as a raw material is subjected directly to dehydration polycondensation (as described, for example, in U.S. Pat. No. 5,310,865), (2) a ring-opening polymerization method, in which a cyclic dimer of lactic acid (lactide) is subjected to melt polymerization (as described, for example, in U.S. Pat. No. 2,758,987), (3) a ring-opening polymerization method, in which cyclic dimers of lactic acid and an aliphatic hydroxycarboxylic acid, such as lactide or glycolide and ε-caprolactone, are subjected to melt polymerization in the presence of a catalyst (as described, for example, in U.S. Pat. No. 4,057,537), (4) a method, in which a mixture of lactic acid, an aliphatic dihydric alcohol and an aliphatic dibasic acid is subjected directly to dehydration polycondensation (as described, for example, in U.S. Pat. No. 5,428,126), (5) a method, in which polylactic acid and a polymer of an aliphatic dihydric alcohol and an aliphatic dibasic acid are condensed in the presence of an organic solvent (as described, for example, in EP0712880/A2), and (6) a method, in which lactic acid is subjected to dehydration polycondensation reaction in the presence of a catalyst to produce a polyester polymer, in which solid polymerization is performed in at least apart of the process.

The polylactic acid resin used in the exemplary embodiment may be a blend or an alloy of polylactic acid and other aliphatic polyester depending on necessity. Examples of the aliphatic polyester include an aliphatic hydroxycarboxylic acid other than lactic acid, and a polymer produced by combining variously an aliphatic dihydric alcohol and an aliphatic dibasic alcohol. The production method of the aliphatic polyester is not particularly limited, and may be the similar method as in the production of the polylactic acid and the copolymer of polylactic acid and an aliphatic polyester.

Specific examples of the aliphatic hydroxycarboxylic acid other than lactic acid include glycolic acid, 3-hydroxybutyric acid, 4-hydroxybutyric acid, 3-hydroxyvaleric acid, 4-hydroxyvaleric acid and 6-hydroxycaproic acid. Examples thereof also include glycolide, which is a dimer of glycolic acid, and ε-caprolactone, which is a cyclic ester of 6-hydroxycaproic acid. These compounds may be used singly or in combination of two or more of them.

Examples of the aliphatic dihydric alcohol include ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol and 1,4-cyclohexanedimethanol. These compounds may be used singly or in combination of two or more of them.

Specific examples of the aliphatic dibasic acid include succinic acid, oxalic acid, malonic acid, glutaric acid, adipic acid, pimelic acid, suberic acid, azelaic acid, sebacic acid, undecanedioic acid and dodecanedioic acid. These compounds may be used singly or in combination of two or more of them.

The average molecular weight of the polylactic acid resin used in the exemplary embodiment is generally approximately 10,000 or more, and preferably approximately 20,000 or more, and is generally approximately 200,000 or less, and preferably approximately 150,000 or less, in terms of weight average molecular weight. In the case where the average molecular weight of the polylactic acid resin is too small, formation of the network by crosslinking tends to be insufficient. In the case where the average molecular weight of the polylactic acid resin is too large, the crosslinking reactivity tends to be decreased.

In the exemplary embodiment, the polylactic acid resin may contain a crystallization accelerator. Examples of the crystallization accelerator include an inorganic filler, such as talc and glass fibers; mica, trimesic acid tricyclohexylamide, trimesic acid tris(2-methylcyclohexylamide) and trimesic acid tris(2,3-dimethylcyclohexylamide). The amount of the crystallization accelerator added is generally from approximately 0.1 to approximately 30 parts by weight relative to 100 parts by weight of the polylactic acid resin.

Polyfunctional Isocyanate Compound

Examples of the polyfunctional isocyanate compound used in the exemplary embodiment include an aliphatic diisocyanate, such as hexamethylene diisocyanate, 2,2,4-trimethylhexamethylene diisocyanate, 3-isocyanatemethyl-3,5,5-trimethylcyclohexyl isocyanate and dicyclhexylmethane 4,4'-diisocyanate; an aromatic diisocyanate, such as 2,4-tolylene diisocyanate, 2,6-tolylene diisocyanate, a mixed diisocyanate of 2,4-tolylene diisocyanate and 2,6-tolylene diisocyanate, 4,4'-diphenylmethane diisocyanate, hydrogenated diphenylmethane diisocyanate, diphenylmethylmethane diisocyanate, 1,3-phenylene diisocyanate, 1,5-naphthylene diisocyanate, xylylene diisocyanate and isophorone diisocyanate; a triisocyanate compound, such as phenyl triisocyanate, cyclohexyl triisocyanate, 3-ethylenepentyl triisocyanate, an adduct of trimethylolpropane and tolylene diisocyanate, and an adduct of trimethylolpropane and 1,6-hexamethylene diisocyanate.

Among these, a trifunctional isocyanate compound is particularly preferred since a homogeneous crosslinked structure of the polylactic acid resin may be obtained. The polyfunctional isocyanate compounds may be used singly or in combination of two or more of them.

Among the polyfunctional isocyanate compounds, a polyfunctional aliphatic isocyanate compound having no aromatic ring in the molecular chain thereof is preferably used from the standpoint of biodegradability of the resin composition.

In the exemplary embodiment, the amount of the polyfunctional isocyanate compound added is not particularly limited, and is generally approximately 0.1 part by weight or more, and preferably approximately 0.3 part by weight or more, relative to 100 parts by weight of the polylactic acid resin. The amount of the polyfunctional isocyanate compound is generally approximately 10 parts by weight or less, and preferably approximately 5 parts by weight or less, relative to 100 parts by weight of the polylactic acid resin.

In the case where the amount of the polyfunctional isocyanate compound added to the polylactic acid resin is too small, there is such a tendency that the crosslinking density is decreased, and the flame retardancy is insufficient. In the case where the amount of the polyfunctional isocyanate compound added is too large, there is such a tendency that the crosslinking density is too large, the space becomes small, and the flexibility is insufficient.

(B) Flame Retardant Additive

The flame retardant additive used as the component (B) in the exemplary embodiment is not particularly limited and may be a known additive. Examples of the flame retardant additive include a boric acid flame retardant compound, a phosphorus flame retardant compound, an inorganic flame retardant compound, a nitrogen flame retardant compound, a halogen flame retardant compound, an organic flame retardant compound and a colloid flame retardant compound. These flame retardant additives may be used singly or in combination of two or more of them.

Examples of the boric acid flame retardant compound include a compound containing boric acid, such as zinc borate hydrate, barium metaborate and borax.

Examples of the phosphorus flame retardant compound include ammonium phosphate, ammonium polyphosphate, aluminum polyphosphate, melamine polyphosphate, melamine pyrophosphate, red phosphorus, a phosphate ester, tris(chloroethyl)phosphate, tris(monochloropropyl) phosphate, tris(dichloropropyl)phosphate, triallyl phosphate, tris (3-hydroxypropyl)phosphate, tris(tribromo-phenyl)phosphate, tris-O-chloropropyl phosphate, tris(dibromophenyl) phosphate, tris(tribromoneopentyl)phosphate, tetrakis(2-chloroethyl)ethylene diphosphate, dimethyl methylphosphate, tris(2-chloroethyl)orthophosphate, an aromatic condensed phosphate ester, a halogen-containing condensed organic phosphate ester, ethylene bis(tris(2-cyanoethyl))phosphonium bromide, β-chloroethyl acid phosphate, butyl pyrophosphate, butyl acid phosphate, butoxyethyl acid phosphate, 2-ethylhexyl acid phosphate, melamine phosphate, a halogen-containing phosphonate and phenylphosphonic acid.

Examples of the inorganic flame retardant compound include a metal sulfate compound, such as zinc sulfate, potassium hydrogen sulfate, aluminum sulfate, antimony sulfate, potassium sulfate, cobalt sulfate, sodium hydrogen sulfate, iron sulfate, copper sulfate, sodium sulfate, nickel sulfate, barium sulfate and magnesium sulfate; an ammonium flame retardant compound, such as ammonium sulfate; an iron oxide combustion catalyst, such as ferrocene; a metal nitrate compound, such as copper nitrate; a titanium-containing compound, such as titanium oxide; a guanidine compound, such as guanidine sulfamate; a carbonate salt compound, such as potassium carbonate; a metal hydroxide, such as aluminum hydroxide and magnesium hydroxide; a zirconium compound, a molybdenum compound, a tin compound, and montmorillonite.

Examples of the nitrogen flame retardant compound include a cyanurate compound having a triazine ring.

Examples of the halogen flame retardant compound include chlorinated paraffin, perchlorocyclopentadecane, hexabromobenzene, decabromodiphenyl oxide, bis(tribromophenoxy)ethane, ethylene bis(dibromonorbornane dicarboxylmide), ethylene bis(tetrabromophthalimide), dibromoethyldibromocyclohexane, dibromoneopentyl glycol, 2,4,6-tribromophenol, tribromophenyl allyl ether, a tetrabromobisphenol A derivative, a tetrabromobisphenol S derivative, tetradecabromodiphenoxybenzene, tris(2,3-dibromopropyl)isocyanurate, 2,2-bis(4-hydroxy-3,5-dibromophenyl)propane, 2,2-bis(4-hydroxyethoxy-3,5-dibromophenyl)propane, poly(pentabromobenzyl acrylate), tribromostyrene, tribromophenylmaleimide, tribromoneopentyl alcohol, tetrabromodipentaerythritol, pentabromobenzyl acrylate, pentabromophenol, pentabromotoluene, pentabromodiphenyl oxide, hexabromocyclododecane, hexabromodiphenyl ether, octabromophenol ether, octabromodiphenyl ether, octabromodiphenyl oxide, dibromoneopentyl glycol tetracarbonate, bis(tribromophenyl)fumaramide, N-methylhexabromodiphenylamine, styrene bromide and diallyl chlorendate.

Examples of the organic flame retardant compound include a silica compound, such as silicone oil, silicon dioxide, low melting point glass and organosiloxane; a compound containing bisphenol A; a glycidyl compound, such as glycidyl ether; a polyhydric alcohol, such as diethylene glycol and pentaerythritol; a modified carbamide compound, chlorendic anhydride, and phthalic anhydride.

Examples of the colloid flame retardant compound include hydroxides such as aluminum hydroxide, magnesium hydroxide and calcium hydroxide; hydrates such as calcium aluminate, calcium sulfate dihydrate (gypsum), zinc borate, barium metaborate, borax, and kaolin clay; a nitric acid compound such as sodium nitrate; colloids such as a molybdenum compound, a zirconium compound, an antimony compound, dawsonite, and phlogopite.

The flame retardant additive used in the exemplary embodiment may be in a solid state and in a particle form at ordinary temperature (for example, from 10 to 60° C.). The volume average particle diameter of the flame retardant additive in a particle form is not particularly limited, and is generally approximately 1 μm or more, and preferably approximately 3 μm or more, and is generally approximately 100 μm or less, and preferably approximately 50 μm or less. In the case where the volume average particle diameter of the flame retardant additive is too small, it is considered that the particle diameter of the flame retardant additive may be smaller than the mesh size of the network formed in the crosslinked polylactic acid resin, and thus the powder of the flame retardant additive tends to be difficult to be fixed in the network. In the case where the volume average particle diameter of the flame retardant additive is too large, it is considered that the powder of the flame retardant additive may not enter the network formed in the crosslinked polylactic acid resin, and thus the flexibility of the resin molded article tends to be decreased.

The volume average particle diameter of the flame retardant additive may be measured with a liquid phase particle size distribution analyzer (for example, a laser Doppler heterodyne particle size distribution analyzer (MICROTRAC-UPA150, available from UPA Nikkiso Co., Ltd.)). Specifically, a cumulative distribution of volume from the small diameter side is provided based on the measured particle size distribution, and the particle diameter at 50% accumulation is designated as the volume average particle diameter.

In the exemplary embodiment, the ratio of the weight of the crosslinked polylactic acid resin (A) and the flame retardant additive (B) is not particularly limited, and the amount of the flame retardant additive (B) is generally approximately 2 parts by weight or more, and preferably approximately 10 parts by weight or more, and is generally approximately 300 parts by weight or less, and preferably approximately 200 parts by weight or less, relative to 100 parts by weight of the crosslinked polylactic acid resin (A).

In the case where the amount of the component (A) is too small, the mechanical strength of the resin molded article obtained with the resin composition tends to be decreased. In the case where the amount of the component (A) is too large, the flame retardancy of the resin composition tends to be decreased.

Hydrolysis Inhibitor

The polylactic acid resin composition of the exemplary embodiment may further contain a hydrolysis inhibitor. There is such a tendency that the addition of a hydrolysis inhibitor suppresses hydrolysis of the polylactic acid resin from occurring, and suppresses the flexibility of the resin molded article obtained with the resin composition from being decreased.

The hydrolysis inhibitor is not particularly limited, and examples thereof include a compound having been known as an additive for suppressing hydrolysis of a polymer compound, such as a compound having a carboxyl group (—COOH) or a hydroxyl group (—OH) in the molecule. Examples of the compound include a carbodiimide compound and an oxazoline compound.

Examples of the carbodiimide compound include dicyclohexylcarbodiimide, diisopropylcarbodiimide, dimethylcarbodiimide, diisobutylcarbodiimide, dioctylcarbodiimide, diphenylcarbodiimide and naphthylcarbodiimide.

Examples of the oxazoline compound include 2,2'-o-phenylenebis(2-oxazoline), 2,2'-m-phenylenebis(2-oxazoline), 2,2'-p-phenylenebis(2-oxazoline), 2,2'-p-phenylenebis(4-methyl-2-oxazoline), 2,2'-m-phenylenebis(4-methyl-2-oxazoline), 2,2'-p-phenylenebis(4,4'-dimethyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4-methyl-2-oxazoline) and 2,2'-diphenylenebis(2-oxazoline). These hydrolysis inhibitors may be used singly or in combination of two or more of them.

The amount of the hydrolysis inhibitor added is not particularly limited, and in the exemplary embodiment, is generally approximately 5 parts by weight or less, and preferably approximately 3 parts by weight or less, relative to 100 parts by weight of the polylactic acid resin. In the case where the amount of the hydrolysis inhibitor added is too large with respect to the polylactic acid resin, the flame retardancy of the resin composition tends to be decreased. It is preferred that the amount ratio of hydrolysis inhibitor to flame retardant ranges from 1:2 to 1:50 from the viewpoint of flame retardancy.

Other Additives

The polylactic acid resin composition of the exemplary embodiment may further contain other known additives. Examples of the known additives include a reinforcing material, an inorganic filler, an organic filler, an antioxidant, a heat stabilizer, an ultraviolet ray absorbent, a lubricant, wax and a colorant. These materials may be used singly or in combination of two or more of them.

Examples of the reinforcing material include glass microbeads, carbon fibers, chalk, quartz, asbestos, feldspar, mica, talc, wollastonite and kaolin. Examples of the inorganic filler include carbon and silicon dioxide, and also include alumina, silica, magnesia, ferrite, barium sulfate, calcium carbonate and fullerene. Examples of the organic filler include an epoxy resin, a melamine resin, a urea resin, an acrylic resin, a phenol resin, a polyimide resin, a polyimide resin, a polyester resin and a fluorine resin. These materials may be used singly or in combination of two or more of them.

Examples of the antioxidant include a phenol series, an amine series, a phosphorus series, a sulfur series, a hydroquinone series and a quinoline series.

Examples of the heat stabilizer include a nitrogen-containing compound, such as a basic nitrogen-containing compound, e.g., polyamide, poly-$\beta$-alanine copolymer, polyacrylamide, polyurethane, melamine, cyanoguanidine and a melamine-formaldehyde condensate; an alkali or alkaline earth metal-containing compound, such as an organic metal carboxylate salt (e.g., calcium stearate and calcium 12-hydroxystearate), a metal oxide (e.g., magnesium oxide, calcium oxide and aluminum oxide), a metal hydroxide (e.g., magnesium hydroxide, calcium hydroxide and aluminum hydroxide), and a metal carbonate; zeolite; and hydrotalcite.

Examples of the ultraviolet ray absorbent include a benzophenone series, a benzotriazole series, a cyanoacrylate series, a salicylate series and an oxalic anilide series.

Examples of the lubricant include a petroleum lubricating oil, such as liquid paraffin; a synthetic lubricating oil, such as a halogenated hydrocarbon, a diester oil, a silicone oil and a fluorinated silicone; a modified silicone oil (such as epoxy-modified, amino-modified, alkyl-modified and polyether-modified); a silicone lubricating substance, such as a copolymer of an organic compound, e.g., polyoxyalkylene glycol, and silicone; a silicone copolymer; a fluorine surfactant, such as a fluoroalkyl compound; a fluorine lubricating substance, such as a trifluoromethylene chloride oligomer; wax, such as paraffin wax and polyethylene wax; a higher aliphatic alcohol, a higher aliphatic amide, a higher fatty acid ester, a higher fatty acid salt, and molybdenum disulfide.

Examples of the wax include olefin wax, such as polypropylene wax and polyethylene wax, paraffin wax, Fischer-Tropsch wax, microcrystalline wax, montan wax, fatty acid amide wax, higher aliphatic alcohol wax, higher fatty acid wax, fatty acid ester wax, carnauba wax, and rice wax.

Examples of the colorant include an inorganic pigment, an organic pigment and a dye.

Method for Producing Polylactic Acid Resin Composition

Examples of the method for producing a polylactic acid resin composition of the exemplary embodiment include a method of kneading a polylactic acid resin, a polyfunctional isocyanate compound, and a flame retardant additive, by using a known kneader. Examples of the kneader include a Banbury mixer, a single screw extruder, a double screw extruder, a co-kneader and a multi screw extruder. Among these, a double screw extruder and a single screw extruder are preferably used.

Specifically, for example, the polylactic acid resin, the polyfunctional isocyanate compound, the flame retardant additive and other additives are melt-kneaded with an extruder or a double screw extruder at a cylinder temperature of from approximately 160° C. to approximately 250° C., and preferably from approximately 170° C. to approximately 200° C., and extruded to form strands, which are then cut into cylindrical pellets as a master batch. In alternative, without formation of strands, a master batch may be prepared in the form of spherical particles by a hot-cutting method or an underwater cutting method.

Polylactic Acid Resin Molded Article

A polylactic acid resin molded article may be obtained with the aforementioned polylactic acid resin composition. The polylactic acid molded article of the exemplary embodiment (which is hereinafter referred simply to as a molded article) contains the crosslinked polylactic acid resin (A) and the flame retardant additive (B).

The molded article of the exemplary embodiment is excellent in flame retardancy with flexibility of the polylactic acid resin maintained, and thus may be favorably applied to such purposes as electronic and electric equipments, home electric equipments, containers, and automobile interior materials. More specifically, the molded article may be favorably applied to chassis and parts of a home electric equipment and an electronic or electric equipment, wrapping films, storage cases for CD-ROM, DVD or the like, dishes, food trays, beverage bottles, drug wrapping materials, and among these, may be particularly favorably applied to parts of an electronic or electric equipment.

Method for Producing Polylactic Acid Resin Molded Article

The method for producing a polylactic acid resin molded article is not particularly limited, and examples thereof include known molding methods. Examples of the known molding method include film molding, extrusion molding and injection molding, and among these injection molding is preferably used. Specifically, the extrusion molding may be performed according to ordinary procedures, for example, with a known extrusion molding machine, such as a single screw extruder, a multiple screw extruder and a tandem extruder. The injection molding may be performed according to ordinary procedures, for example, with a known injection molding machine, such as an in-line screw injection molding machine, a multi-layer injection molding machine and a twin head injection molding machine.

In the exemplary embodiment, a resin composition may be injection-molded to a die under conditions of a cylinder temperature of an injection molding machine of from approximately 160° C. to approximately 220° C. The temperature of the die upon injection-molding may be in a range of from approximately 30° C. to approximately 150° C.

EXAMPLE

The invention will be described in more detail with reference to examples below. The invention is not limited to the examples.

Examples 1 to 17 and Comparative Examples 1 to 3

A polylactic acid resin, a polyfunctional isocyanate, a flame retardant additive and other additives are kneaded with the formulations and the cylinder temperature conditions shown in Tables 1 to 3 with a twin screw kneader (TEM58SS, available from Toshiba Machine Co., Ltd.,) to prepare pellets of polylactic acid resin compositions (Examples 1 to 17). For comparison, pellets of resin compositions containing no polyfunctional isocyanate (Comparative Examples 1 to 3) and resin compositions containing no flame retardant additive (Comparative Examples 2 and 3) are prepared with the formulations and the cylinder temperature conditions shown in Table 3.

ISO multipurpose dumbbell specimens (for ISO527 tensile test and ISO178 bending test, thickness: 4 mm, width: 10 mm) are formed with the pellets of the polylactic acid resin compositions, and subjected to the characteristic tests of the polylactic acid resin molded articles as follows (Examples 1 to 17). Specimens are formed with the resin compositions of Comparative Examples 1 to 3, and subjected to the characteristic tests of the resin molded articles. The results obtained are shown in Tables 1 to 3.

(1) Crosslinking Density of Polylactic Acid Resin Molded Article

A polymer is pretreated and measured for IR spectrum with an FTIR apparatus (FT/RI-6300, available from JASCO Corporation) and for IR and NMR spectra with a 1H-NMR apparatus, and the crosslinking density is quantitatively determined by using a calibration curve prepared with the standard samples.

(2) Flame Retardancy Test of Polylactic Acid Resin Molded Article

A polylactic acid resin composition is injection-molded to specimens under the UL Standard with two thicknesses (1.2 mm and 1.6 mm) with an injection molding machine (NEX50, available from Nissei Plastic Industrial Co., Ltd.) under conditions of the cylinder temperatures shown in Tables 1 to 3 and a molding cycle of 1 minute, and the specimens are subjected to the 20 mm vertical combustion test under the UL Standard 94. "V0" means that the specimen is rated V0, "V1" means that the specimen is rated V1, and "NotV" means that the specimen fails the test.

The tests for the rates V0 and V1 are performed with 5 specimens for each test. Specifically, a burner flame is applied to a lower end of a specimen in a strip form held vertically, and after lapsing 10 seconds, the burner flame is released from the specimen. When fire is extinguished, a burner flame is immediately applied for 10 seconds and then released.

The rates V0 and V1 are determined by the flaming combustion durations after completing the first and second applications of flame, the total duration of the flaming combustion and the flameless combustion after completing the second application of flame, the total duration of the flaming combustion durations of five specimens, and the presence of combustion drips.

In both the first and second applications of flame, the rates V0 and V1 are determined as to whether flaming combustion is completed within 10 seconds for V0 or within 30 seconds for V1. With respect to the total duration of the flaming combustion and the flameless combustion after completing the second application of flame, the rates are determined as to whether the total duration is 30 seconds or less for V0 or is 60 seconds or less for V1.

The rates are also determined as to whether the total duration of the flaming combustion durations of five specimens is 50 seconds or less for V0 or is 250 seconds or less for V1. For passing the test, all the specimens are necessarily not burnt out.

(3) Bending Elastic Distortion of Polylactic Acid Resin Molded Article

Pellets of a polylactic acid resin composition are injection-molded to an ISO multipurpose dumbbell specimen according to the ISO527 tensile test as a polylactic acid resin molded article with an injection molding machine (NEX50, available from Nissei Plastic Industrial Co., Ltd.) under conditions of the cylinder temperatures and the die temperatures shown in Tables 1 to 3. The ISO multipurpose dumbbell specimen thus prepared is subjected to the ISO178 bending test for measuring the bending elastic distortion of the polylactic acid resin molded article.

TABLE 1

| | | | Example | | | | | | |
|---|---|---|---|---|---|---|---|---|---|
| | | | 1 | 2 | 3 | 4 | 5 | 6 | 7 |
| Resin composition | Polylactic acid resin (*) | Terramac TE-2000 | 100 | 100 | 100 | 100 | 100 | 100 | 100 |
| | Polyfunctional isocyanate compound | Phenyl triisocyanate | 1 | 4 | 8 | — | — | — | 0.5 |
| | | Cyclohexyl triisocyanate | — | — | — | 4 | — | — | — |
| | | 3-Ethylenepentyl triisocyanate | — | — | — | — | 4 | — | — |
| | | Phenyl diisocyanate | — | — | — | — | — | 4 | — |
| | Flame retardant additive (**) | Terraju C80 | 30 | 30 | 30 | 30 | 30 | 30 | 30 |
| Kneading condition | | Cylinder temperature ° C. | 180 | 180 | 180 | 180 | 180 | 180 | 180 |
| Molding condition | | Cylinder temperature ° C. | 180 | 180 | 180 | 180 | 180 | 180 | 180 |
| Die temperature ° C. | | | 40 | 40 | 40 | 40 | 40 | 40 | 40 |
| Properties of molded article | Crosslinking density | | 4.9 | 2.8 | 2.9 | 2.8 | 2.7 | 3.1 | 1.6 |
| | Flame retardancy test | 0.8 mm V | V0 | V0 | V0 | V0 | V0 | V0 | V0 |
| | | 1.6 mm V | V0 | V0 | V0 | V0 | V0 | V0 | V0 |
| | Bending elastic distortion % | | 10≤ | 10≤ | 10≤ | 10≤ | 10≤ | 10≤ | 8.5 |

TABLE 2

| | | | Example | | | | | | |
|---|---|---|---|---|---|---|---|---|---|
| | | | 8 | 9 | 10 | 11 | 12 | 13 | 14 |
| Resin composition | Polylactic acid resin (*) | Terramac TE-2000 | 100 | 100 | 100 | 100 | 100 | 100 | 100 |
| | Polyfunctional isocyanate compound | Phenyl triisocyanate | 8 | 4 | 4 | 4 | 4 | 4 | 4 |
| | Flame retardant additive (**) | Terraju C80 | 30 | 2 | 200 | — | — | — | 30 |
| | | Exolit AP422 | — | — | — | 30 | — | — | — |
| | | Pulverized product of Exolit AP422 | — | — | — | — | 30 | — | — |
| | | Melt-aggregated product of Exolit AP422 | — | — | — | — | — | 30 | — |
| | Hydrolysis inhibitor | Carbodiimide (***) | — | — | — | — | — | — | 4 |
| Kneading condition | | Cylinder temperature °C. | 180 | 170 | 190 | 180 | 180 | 180 | 190 |
| Molding condition | | Cylinder temperature °C. | 180 | 170 | 190 | 180 | 180 | 180 | 190 |
| Die temperature °C. | | | 40 | 40 | 40 | 40 | 40 | 40 | 40 |
| Properties of molded article | Crosslinking density | | 5.2 | 2.9 | 2.8 | 2.3 | 2.8 | 2.9 | 5.6 |
| | Flame retardancy test | 0.8 mm V | V0 | V1 | V0 | V0 | V1 | V0 | V0 |
| | | 1.6 mm V | V0 | V1 | V0 | V0 | V0 | V0 | V0 |
| | Bending elastic distortion % | | 8.9 | 10≤ | 7.2 | 10≤ | 9.3 | 6.8 | 10≤ |

TABLE 3

| | | | Example | | | Comparative Example | | |
|---|---|---|---|---|---|---|---|---|
| | | | 15 | 16 | 17 | 1 | 2 | 3 |
| Resin composition | Polylactic acid resin (*) | Terramac TE-2000 | — | — | — | 100 | 100 | — |
| | | Terramac TE-7000 | 100 | 100 | 100 | — | — | 100 |
| | Polyfunctional isocyanate compound | Phenyl triisocyanate | 4 | 4 | 4 | — | — | — |
| | | Methyl diisocyanate | — | — | — | — | 1 | 1 |
| | Flame retardant additive (**) | Terraju C80 | 30 | — | 30 | 30 | — | — |
| | | Exolit AP422 | — | 30 | — | — | — | — |
| | Hydrolysis inhibitor | Carbodiimide (***) | — | — | 4 | — | — | — |
| Kneading condition | | Cylinder temperature °C. | 180 | 180 | 190 | 180 | 180 | 180 |
| Molding condition | | Cylinder temperature °C. | 180 | 180 | 190 | 180 | 180 | 180 |
| Die temperature °C. | | | 110 | 110 | 110 | 110 | 110 | 40 |
| Properties of molded article | Crosslinking density | | 2.5 | 2.6 | 4.3 | 0 | 1.1 | 1.3 |
| | Flame retardancy test | 0.8 mm V | V0 | V0 | V0 | NotV | NotV | NotV |
| | | 1.6 mm V | V0 | V0 | V0 | V1 | NotV | NotV |
| | Bending elastic distortion % | | 9.5 | 9.3 | 10≤ | 0.7 | 2.5 | 2.8 |

The components of the polylactic acid resin compositions shown in Tables 1 to 3 are as follows.
(*) Polylactic Acid Resin:
Terramac TE-2000 (available from Unitika Ltd.)
Terramac TE-7000 (available from Unitika Ltd.)
(**) Flame Retardant Additive:
Terraju C80, ammonium polyphosphate (volume average particle diameter: 30 μm, available from Budenheim Iberica Comercial S.A.)
Exolit AP422, ammonium polyphosphate (volume average particle diameter: 20 μm, available from Clariant Japan Co., Ltd.)
Pulverized product of Exolit AP422, ammonium polyphosphate (volume average particle diameter: 0.8 μm, available from Clariant Japan Co., Ltd.)
Melt-aggregated product of Exolit AP422, ammonium polyphosphate (volume average particle diameter: 120 μm, available from Clariant Japan Co., Ltd.)
(***) Hydrolysis Inhibitor
Carbodilite LA1 (available from Nisshinbo Chemical Inc.)

It is understood from Tables 1 to 3 that the polylactic acid resin molded articles obtained with the polylactic acid resin compositions each containing the crosslinked polylactic acid resin (A) and the flame retardant additive (B) show good results in the flame retardancy test and have a large bending elastic distortion (%), and thus are excellent in flame retardancy with flexibility of the polylactic acid resin maintained (Examples 1 to 17).

It is also understood therefrom that the bending elastic distortion (%) is lowered even when the flame retardant additive is added to the polylactic resin that does not form a crosslinked structure with a polyfunctional isocyanate compound (Comparative Example 1). It is further understood therefrom that flame retardancy is not obtained, and the bending elastic distortion (%) is lowered, when a flame retardant additive is not added (Comparative Examples 2 and 3).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A polylactic acid resin composition comprising
   (A) a crosslinked polylactic acid resin that has a crosslinking density of 1.5 or more and 6 or less; and
   (B) a phosphorus flame retardant additive,
   wherein the phosphorus flame retardant additive (B) has a particle form having a volume average particle diameter of 20 μm or more and 30 μm or less.

2. The polylactic acid resin composition according to claim 1, further comprising a hydrolysis inhibitor.

3. The polylactic acid resin composition according to claim 2, wherein the hydrolysis inhibitor is contained in an amount of 5 parts by weight or less relative to 100 parts by weight of the crosslinked polylactic acid resin.

4. The polylactic acid resin composition according to claim 1, wherein the phosphorus flame retardant additive is contained in an amount of 2 parts by weight or more and 300 parts by weight or less relative to 100 parts by weight of the crosslinked polylactic acid resin.

5. The polylactic acid resin composition according to claim 1, wherein the phosphorus flame retardant additive is contained in an amount of 10 parts by weight or more and 200 parts by weight or less relative to 100 parts by weight of the crosslinked polylactic acid resin.

6. The polylactic acid resin composition according to claim 3, wherein a weight ratio of the hydrolysis inhibitor to the phosphorus flame retardant additive ranges from 1:2 to 1:50.

7. The polylactic acid resin composition according to claim 1, wherein the crosslinked polylactic acid resin is formed by a reaction of a polylactic acid resin and a polyfunctional isocyanate compound.

8. The polylactic acid resin composition according to claim 7, wherein the polyfunctional isocyanate compound is contained in an amount of 0.1 part by weight or more and 10 parts by weight or less relative to 100 parts by weight of the polylactic acid resin.

9. A polylactic acid resin molded article comprising
   (A) a crosslinked polylactic acid resin that has a crosslinking density of 1.5 or more and 6 or less, and
   (B) a phosphorus flame retardant additive,
   wherein the phosphorus flame retardant additive (B) has a particle form having a volume average particle diameter of 20 μm or more and 30 μm or less.

10. The polylactic acid resin molded article according to claim 9, wherein the crosslinked polylactic acid resin (A) has a crosslinking density of 1.8 or more and 4.5 or less.

11. The polylactic acid resin molded article according to claim 9, wherein the crosslinked polylactic acid resin is formed by a reaction of a polylactic acid resin and a polyfunctional isocyanate compound.

12. The polylactic acid resin molded article according to claim 11, wherein the polyfunctional isocyanate compound is contained in an amount of 0.1 part by weight or more and 10 parts by weight or less relative to 100 parts by weight of the polylactic acid resin.

13. A method for producing a polylactic acid resin composition, comprising kneading a polylactic acid resin that has a crosslinking density of 1.5 or more and 6 or less, a polyfunctional isocyanate compound, and a phosphorus flame retardant additive,
   wherein the phosphorus flame retardant additive has a particle form having a volume average particle diameter of 20 μm or more and 30 μm or less.

14. The method for producing a polylactic acid resin composition according to claim 13, wherein an amount of the polyfunctional isocyanate compound is 0.1 part by weight or more and 10 parts by weight or less relative to 100 parts by weight of the polylactic acid resin.

15. The method for producing a polylactic acid resin composition according to claim 13, wherein the phosphorus flame retardant additive is contained in an amount of 2 parts by weight or more and 300 parts by weight or less relative to 100 parts by weight of the polylactic acid resin.

16. The method for producing a polylactic acid resin composition according to claim 13, wherein the phosphorus flame retardant additive is contained in an amount of 10 parts by weight or more and 200 parts by weight or less relative to 100 parts by weight of the polylactic acid resin.

* * * * *